(12) United States Patent
Kowoll et al.

(10) Patent No.: US 8,043,577 B2
(45) Date of Patent: Oct. 25, 2011

(54) METHOD AND DEVICE FOR NOZZLE-JETTING OXYGEN INTO A SYNTHESIS REACTOR

(75) Inventors: Johannes Kowoll, Bochum (DE); Max Heinritz-Adrian, Münster (DE); Lothar Semrau, Essen (DE)

(73) Assignee: Uhde GmbH, Dortmund (DE)

(*) Notice: Subject to any disclaimer, the term of this patent is extended or adjusted under 35 U.S.C. 154(b) by 996 days.

(21) Appl. No.: 10/583,572

(22) PCT Filed: Dec. 10, 2004

(86) PCT No.: PCT/EP2004/014050
§ 371 (c)(1),
(2), (4) Date: Sep. 1, 2006

(87) PCT Pub. No.: WO2005/063373
PCT Pub. Date: Jul. 14, 2005

(65) Prior Publication Data
US 2007/0100191 A1 May 3, 2007

(30) Foreign Application Priority Data
Dec. 19, 2003 (DE) .................. 103 59 744

(51) Int. Cl.
*B01J 8/02* (2006.01)
*C07C 5/48* (2006.01)
(52) U.S. Cl. ........ 422/218; 422/211; 422/220; 422/239; 585/654; 585/656; 585/658
(58) Field of Classification Search .................. 585/658, 585/654, 656; 422/211, 218, 220, 239
See application file for complete search history.

(56) References Cited

U.S. PATENT DOCUMENTS

| | | | |
|---|---|---|---|
| 2,361,623 A | 10/1944 | Guyer et al. | |
| 2,518,583 A | 6/1945 | Watson | |
| 2,584,391 A | 2/1952 | Leffer | |
| 2,632,692 A * | 3/1953 | Korin et al. | 422/191 |
| 2,809,981 A | 10/1957 | Kittleson et al. | |
| 2,954,281 A | 9/1960 | Schutt | |
| 3,208,833 A | 9/1965 | Carson | |
| 3,685,971 A | 8/1972 | Carson | |

(Continued)

FOREIGN PATENT DOCUMENTS

CA 2050248 3/1992

(Continued)

OTHER PUBLICATIONS

International Search Report in English.

*Primary Examiner* — In Suk Bullock
*Assistant Examiner* — Bradley Etherton
(74) *Attorney, Agent, or Firm* — Collard & Roe, P.C.

(57) ABSTRACT

With the help of a method and device for nozzle-jetting oxygen into a synthesis reactor, e.g. for oxy-dehydration, with largely axial flow of the gas mixture through a catalyst bed, it is intended to vastly improve the mixing-in and mixing-through of oxygen above the catalyst especially for oxy-dehydration process.
This is achieved by feeding the oxygen to a ring distributor system arranged above the catalyst bed in pure form, as air or mixed with inert gas or water vapor and jetting the oxygen onto the catalyst surface through several exit openings in the ring distributor at an inclined angle deviating from the vertical.

9 Claims, 2 Drawing Sheets

U.S. PATENT DOCUMENTS

Figure 1:
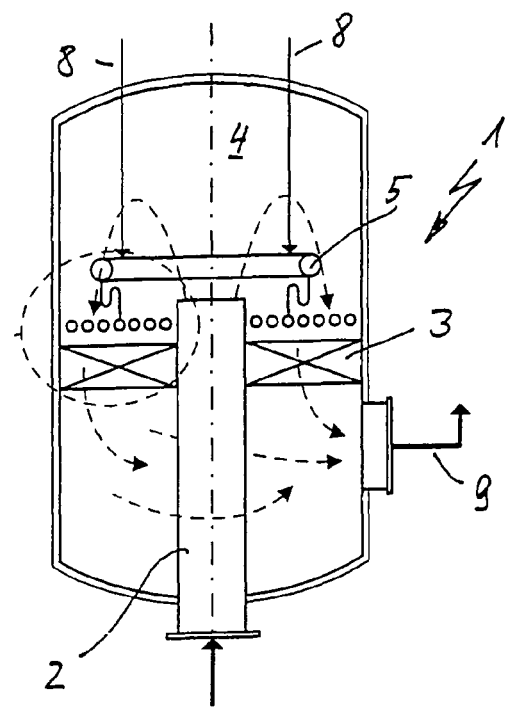

| | | | |
|---|---|---|---|
| 3,855,330 A | 12/1974 | Mendelsohn et al. | |
| 4,166,834 A * | 9/1979 | Reed et al. | 422/148 |
| 4,223,843 A | 9/1980 | Smith et al. | |
| 4,350,665 A * | 9/1982 | Hashimoto et al. | 422/191 |
| 4,372,920 A * | 2/1983 | Zardi | 422/148 |
| 4,443,551 A * | 4/1984 | Lionetti et al. | 502/41 |
| 4,595,145 A * | 6/1986 | Pratt et al. | 239/558 |
| 4,705,621 A | 11/1987 | Penick et al. | |
| 4,741,885 A | 5/1988 | Herbort et al. | |
| 4,865,820 A * | 9/1989 | Dunster et al. | 422/220 |
| 4,971,771 A | 11/1990 | Stahl et al. | |
| 4,994,239 A | 2/1991 | Skraba | |
| 5,043,500 A | 8/1991 | Tagamolila | |
| 5,430,219 A | 7/1995 | Sanfilippo et al. | |
| 5,439,859 A | 8/1995 | Durante et al. | |
| 5,935,489 A | 8/1999 | Hershkowitz et al. | |
| 2002/0098136 A1 * | 7/2002 | Vanderborgh | 422/220 |

FOREIGN PATENT DOCUMENTS

| | | |
|---|---|---|
| DE | 32 40 089 | 10/1983 |
| DE | OS 43 33 372 | 4/1994 |
| EP | 0 360 981 | 4/1990 |
| EP | 0 364 664 | 4/1990 |
| EP | 0 473 870 A | 3/1992 |
| GB | 2 065 492 | 7/1981 |
| GB | 2 110 105 | 6/1983 |
| WO | WO 01/76731 A1 | 10/2001 |

* cited by examiner

Rays perpendicular to the catalyst

Rays obliquely to the catalyst

METHOD AND DEVICE FOR NOZZLE-JETTING OXYGEN INTO A SYNTHESIS REACTOR

CROSS REFERENCE TO RELATED APPLICATIONS

Applicants claim priority under 35 U.S.C. §119 of German Application No. 103 59 744.1 filed Dec. 19, 2003. Applicants also claim priority under 35 U.S.C. §365 of PCT/EP2004/014050 filed Dec. 10, 2004. The international application under PCT article 21(2) was not published in English.

The invention relates to a method and a device for nozzle-jetting oxygen into a synthesis reactor, e.g. for oxy-dehydration, with largely axial flow of the gas mixture through a catalyst bed.

There are a series of catalytic methods in which oxygen is additionally fed to the reacting gas in a reactor, like in the so called oxy-dehydration of propane or butane, where the oxygen is mixed with the gas flowing into the oxy-dehydration reactor before contacting the catalyst. It has been especially seen that the irregular mixing of the gas flowing into the catalyst with oxygen leads to unsatisfactory results, perhaps because of soot formation above the catalyst or due to insufficient material yield, like the yield of propylene.

This invention accomplishes the task of clearly improving the mixing of the oxygen above the catalyst, particularly for oxy-dehydration processes.

This task is accomplished according to the invention with the help of a method of the type described above, where the oxygen is fed to a ring distributor system arranged above the catalyst bed and is nozzle-jetted on to the catalyst surface through several exit holes in the ring distributor at an angle inclined away from the vertical. The oxygen could be present in pure form, as air, or mixed with inert gas or water vapour.

It has been seen with the help of this method that mixing can be achieved within a very short time 100 ms, so that the reaction time in zones with over-stoichiometric oxygen concentrations and the non-catalytic reactions get minimised. As the mixing takes place in the open space above the catalyst bed and the oxygen-rich mixture has no contact with walls or the catalyst, damage caused to materials due to the nozzle-jetted oxygen gets minimised.

Alternative designs of the invention can be understood from the sub-claims. Depending on the reactor design it could be favourable to carry out jetting of the oxygen only in the direction of the reactor center or only in the direction of the reactor wall or even in tangential direction, whereby there is obviously a further variant, where these flow directions of the oxygen can occur in one as well as also in the other direction simultaneously if required in different axial planes. With the different flow angles, while modifying already existing plants one can adapt to the respective reactor design.

A method has proven to be particularly useful in which the jetting of oxygen takes place in tangential alignment and for each ring of the ring distributor to be disposed in alternating alignment from ring to ring of the ring distributor.

In another extension of the method the jetting of oxygen takes place in a plane approximately 50-300 mm above the catalyst bed, which ensures an oxygen dwelling time of $\leq 1$ second in the space above the catalyst bed.

In order to accomplish the stated task, the invention also provides a synthesis reactor, which has the special feature of a ring distributor consisting of several concentric ring pipes, provided with exit holes above a catalyst bed, where the exit opening are designed to give off oxygen on to the catalyst surface at an angle inclined away from the vertical.

The gas exit openings can be designed as holes or nozzles.

At this juncture reference is being made to some literature from the state-of-the-art technology. Thus DE-OS 43 33 372 publishes a method for manufacturing olefins from methane containing gas mixtures, or the document U.S. Pat. No. 5,935,489 shows a method and a device for producing synthesis gas with partial oxidation or the U.S. Pat. Nos. 2,518,583, 2,809,981 or 2,954,281 are other examples. From the document U.S. Pat. No. 2,584,391 one can learn about jetting of a reactant in directions deviating from the vertical in order to achieve a more effective contact between solid and gas particles in a fluidized reactor belt. Devices for distributing fluids above or between catalyst beds are shown in the documents U.S. Pat. No. 2,632,692, U.S. Pat. No. 3,208,833 or U.S. Pat. No. 3,685,971. A spiral-shaped distributor is shown in WO 01/76731-A1.

Design extensions of the invention can be understood from the sub-claims relating to the device.

Further features, details and advantages of the invention can be obtained on the basis of the following description as well as the drawing. The following are shown:

FIG. 1 A very simplified depiction of a device according to the invention; and

Figure 2:
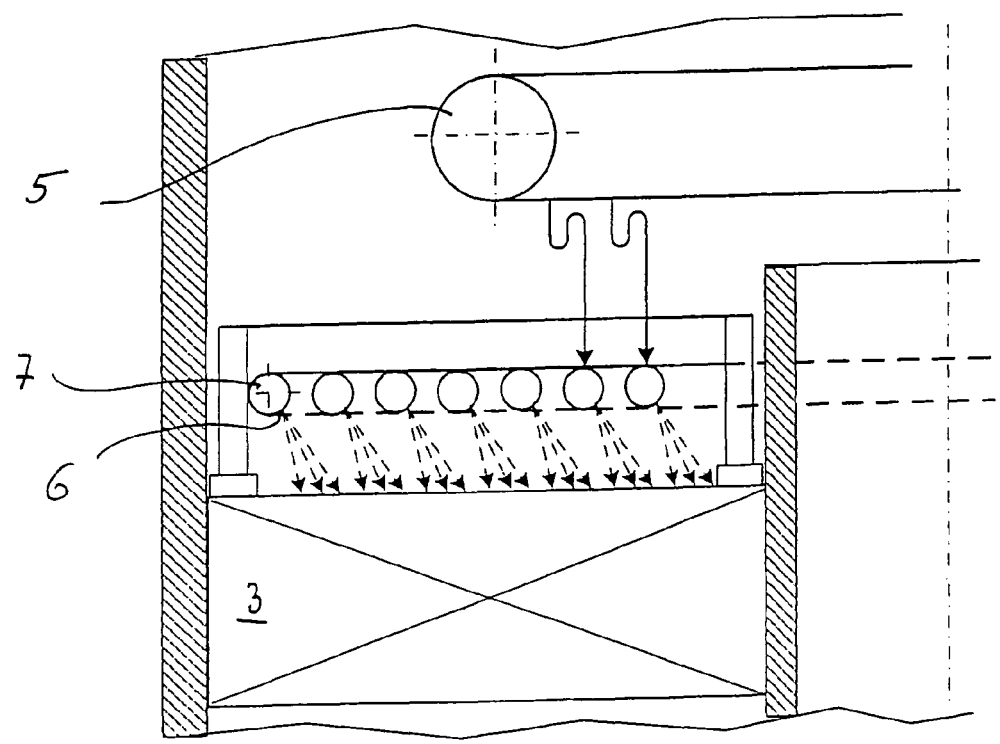
Figure 3:
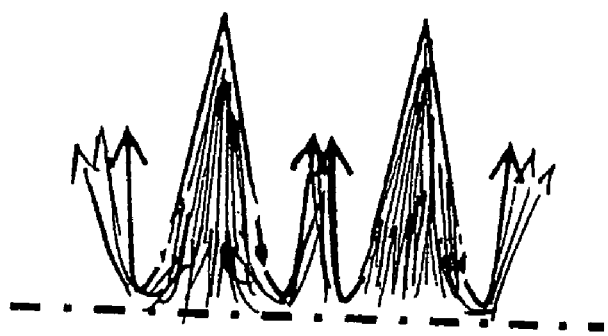
Figure 4:
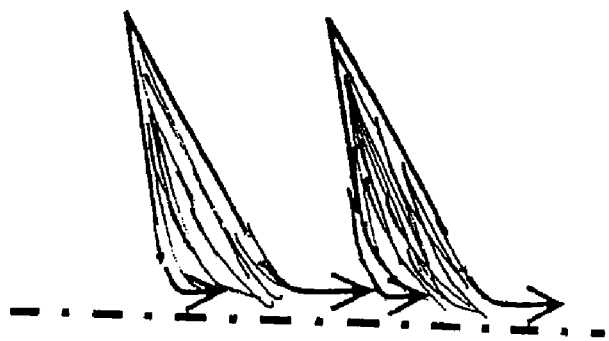

FIG. 2 a detailed enlargement as sectional drawing of the ring distributor system for oxygen introduction; and FIGS. 3 & 4 Principle sketches of the flow-up direction of two jets of oxygen particles on to the catalyst bed for different meeting angles.

The oxy-reactor depicted schematically in cross-section in FIG. 1 and generally denoted by the reference sign 1 has a gas inlet pipe 2 that centrically penetrates a horizontally arranged catalyst 3, where a gas dome 4 is formed above the catalyst bed in the reactor.

The centric gas inlet pipe 2 is surrounded by a ring distributor 5 for oxygen in pure form, as air or mixed with inert gas or water vapour, where this ring pipe 5 feeds several ring pipes 7 equipped with exit openings 6 that are arranged above the catalyst 3. See FIG. 2. The exit openings 6 are arranged in such a way that the respective oxygen jet meets the catalyst surface at an angle deviating from the vertical, whereby in FIG. 3 the vertical meeting situation is depicted as in FIG. 4 a situation according to the invention.

In FIG. 1 the oxygen entry into the ring distributor 5 is indicated only by the arrows 8; even the gas exit of the reactor is only indicated and bears the reference sign 9.

With the help of the inclined meeting direction of the oxygen jet on to the catalyst bed as indicated in FIG. 4, among other things one can prevent a large-spaced circulation of the oxygen containing gas.

As indicated in FIG. 3 in case of vertical flow adjacent jets meet the catalyst on one another, whereby one can achieve a preventive circulation.

Of course the described design example of the invention can still be changed in several respects without departing form the basic idea; especially the meeting angle can be selected according to the type of the reactor or in some other way.

The invention claimed is:

1. A method for nozzle-jetting oxygen into a synthesis reactor for oxy-dehydration for largely axial flow of the gas mixture through a catalyst bed, wherein the oxygen is fed to a ring distributor system having a plurality of concentric ring pipes provided with respective exit openings and arranged above the catalyst bed, the oxygen being fed in pure form, as air mixed with inert gas, or in water vapor, and is jetted in the form of oxygen jets on to the catalyst surface through the exit openings in the ring distributor at an inclined angle from the vertical; wherein the oxygen is jetted in a plane about 50-300 mm above the catalyst bed to ensure an oxygen dwelling time of ≦1 second in a space above the catalyst bed, and wherein the oxygen jets do not overlap each other prior to reaching the catalyst bed.

2. The method according to claim 1, wherein the jetting of the oxygen is taken up in a direction on to the reactor center and/or in direction on to the reactor wall and/or in a tangential alignment.

3. The method according to claim 1, wherein the jetting of the oxygen takes place in tangential alignment and for each concentric ring pipe of the ring distributor in alternating alignment from concentric ring pipe to concentric ring pipe of the ring distributor.

4. A synthesis reactor for oxy-dehydration comprising:
 (a) a catalyst bed; and
 (b) a device, for nozzle-jetting oxygen onto the catalyst bed, comprising a ring distributor having a plurality of concentric ring pipes provided with respective exit openings above the catalyst bed;
 wherein largely axial flow of gas mixture through the catalyst bed occurs;
 wherein the exit openings are designed to jet the oxygen in the form of oxygen jets onto a catalyst surface of the catalyst bed at an angle inclined away from the vertical such that the oxygen jets do not overlap each other prior to reaching the catalyst bed; and
 wherein the ring distributor is positioned in a plane about 50-300 mm above the catalyst bed to ensure an oxygen dwelling time of ≦1 second in a space above the catalyst bed.

5. The synthesis reactor according to claim 4, further comprising:
 (c) a central gas inlet pipe centrically penetrating the catalyst bed; and
 (d) a mixing dome above the catalyst bed;
 wherein the ring distributor surrounds the centric gas inlet pipe.

6. The synthesis reactor according to claim 4, wherein the exit openings ensure a gas flow in a direction on to a reactor center and/or reactor wall and/or in a tangential direction.

7. The synthesis reactor according to claim 4, wherein adjacent exit openings of the exit openings have different flow outlet directions.

8. The synthesis reactor according to claim 4, wherein the exit openings are aligned in alternating sequence to adjacent exit openings of the exit openings of an adjacent ring pipe of the plurality of concentric ring pipes.

9. The synthesis reactor according to claim 4, wherein the exit openings are designed as holes or nozzles.

* * * * *